(12) United States Patent
Fujikawa et al.

(10) Patent No.: US 9,073,469 B2
(45) Date of Patent: Jul. 7, 2015

(54) VEHICLE SEAT (71) Applicants: TOYOTA BOSHOKU KABUSHIKI KAISHA, Aichi-ken (JP); NHK SPRING CO., LTD., Kanagawa (JP)

(72) Inventors: Naoki Fujikawa, Aichi-ken (JP); Hisashi Murafuji, Kanagawa (JP)

(73) Assignees: TOYOTA BOSHOKU KABUSHIKI KAISHA, Aichi-Ken (JP); NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 14/081,096

(22) Filed: Nov. 15, 2013

(65) Prior Publication Data

US 2014/0139003 A1 May 22, 2014

(30) Foreign Application Priority Data

Nov. 19, 2012 (JP) ................................. 2012-253212

(51) Int. Cl.
| A47C 7/14 | (2006.01) |
| A47C 7/18 | (2006.01) |
| B60N 2/72 | (2006.01) |
| B60N 2/70 | (2006.01) |

(52) U.S. Cl.
CPC ................ B60N 2/72 (2013.01); B60N 2/7094 (2013.01)

(58) Field of Classification Search
CPC ....... B60N 2/7094; B60N 2/72; B60N 2/7011
USPC ................................................... 297/452.56
See application file for complete search history.

(56) References Cited

U.S. PATENT DOCUMENTS

| 4,702,522 A | * | 10/1987 | Vail et al. .................. 297/452.56 |
| 4,723,816 A | * | 2/1988 | Selbert et al. ............ 297/452.56 |
| 4,842,257 A | * | 6/1989 | Abu-Isa et al. ...... 297/452.56 X |
| 4,883,320 A | * | 11/1989 | Izumida et al. .......... 297/452.56 |
| 5,013,089 A | * | 5/1991 | Abu-Isa et al. ...... 297/452.56 X |
| 5,393,126 A | * | 2/1995 | Boulva ..................... 297/452.56 |
| 5,439,271 A | * | 8/1995 | Ryan ........................ 297/452.56 |
| 5,533,789 A | * | 7/1996 | McLarty, III et al. ... 297/452.56 X |
| 6,082,824 A | * | 7/2000 | Chow ....................... 297/452.56 |
| 6,106,071 A | * | 8/2000 | Aebischer et al. ... 297/452.56 X |
| 6,152,534 A | * | 11/2000 | Maeda et al. ............ 297/452.56 |
| 6,213,557 B1 | * | 4/2001 | Aebischer et al. ... 297/452.56 X |
| 6,231,125 B1 | * | 5/2001 | Maeda et al. ............ 297/452.56 |
| 6,302,487 B1 | * | 10/2001 | Fujita et al. .............. 297/452.56 |

(Continued)

FOREIGN PATENT DOCUMENTS

| JP | 2010-253242 | 11/2010 |
| JP | 2011-254952 | 12/2011 |

Primary Examiner — Rodney B White
(74) Attorney, Agent, or Firm — Greenblum & Bernstein, P.L.C.

(57) ABSTRACT

A vehicle seat includes a seat component member that has a frame member, a cushion material, and a support member arranged on the frame member. The support member includes a frame-shaped member having a polygonal shape that can be attached to the frame member, and a bag-shaped planar member that is attached to the frame-shaped member in a tensioned state to support the cushion material. The frame-shaped member can be accommodated in the bag-shaped planner member while at least one side of the frame-shaped member is at a contracted state. The frame-shaped member is maintained at an expanded state as the at least one side of the frame-shaped member is at a non-contracted state, such that the planner member is expanded from an inner side thereof and is maintained at the tensioned state.

3 Claims, 8 Drawing Sheets

(56) References Cited

U.S. PATENT DOCUMENTS

| | | | | |
|---|---|---|---|---|
| 6,361,117 | B1* | 3/2002 | Tate | 297/452.56 |
| 6,375,269 | B1* | 4/2002 | Maeda et al. | 297/452.56 |
| 6,378,949 | B1* | 4/2002 | Maeda et al. | 297/452.56 |
| 6,478,381 | B1* | 11/2002 | Cramb et al. | 297/452.56 X |
| 6,789,844 | B1* | 9/2004 | Dennis | 297/452.56 X |
| 7,090,300 | B2* | 8/2006 | Fujita | 297/452.56 X |
| 7,255,404 | B2* | 8/2007 | Neale | 297/452.56 |
| 7,275,793 | B2* | 10/2007 | Fujita et al. | 297/452.56 |
| 7,416,256 | B2* | 8/2008 | Fujita et al. | 297/452.56 |
| 7,503,627 | B2* | 3/2009 | Kawasaki | 297/452.56 |
| 7,600,821 | B2* | 10/2009 | Yasuda et al. | 297/452.56 X |
| 7,618,096 | B2* | 11/2009 | Fujita et al. | 297/452.56 |
| 7,731,294 | B2* | 6/2010 | Yasuda et al. | 297/452.56 |
| 7,845,733 | B2* | 12/2010 | Fujita et al. | 297/452.56 X |
| 7,971,939 | B2* | 7/2011 | Fujita et al. | 297/452.56 |
| 8,506,016 | B2 | 8/2013 | Mizobata | |
| 8,801,094 | B2* | 8/2014 | Nishiura et al. | 297/452.56 X |
| 2002/0060493 | A1* | 5/2002 | Nishino et al. | 297/452.56 |
| 2002/0096932 | A1* | 7/2002 | Fujita et al. | 297/452.56 |
| 2003/0193231 | A1* | 10/2003 | Fujita et al. | 297/452.56 |
| 2005/0236884 | A1* | 10/2005 | Neale | 297/452.56 |
| 2006/0214484 | A1* | 9/2006 | Zaharakos | 297/452.56 X |
| 2008/0079307 | A1* | 4/2008 | Su | 297/452.56 |
| 2008/0122285 | A1* | 5/2008 | Lin | 297/452.56 |
| 2009/0224594 | A1* | 9/2009 | Picard | 297/452.56 |
| 2010/0237679 | A1* | 9/2010 | Tsukiji et al. | 297/452.56 X |
| 2011/0298269 | A1 | 12/2011 | Mizobata | |
| 2012/0267939 | A1* | 10/2012 | Ota | 297/452.56 |
| 2012/0299359 | A1* | 11/2012 | Abe | 297/452.56 |

* cited by examiner

VEHICLE SEAT

BACKGROUND OF THE INVENTION

1. Field of the Invention

The present invention relates to a vehicle seat having a frame member, a cushion material and a support member (a member supporting the cushion material above the frame member).

2. Description of the Related Art

JP-A-2010-253242 discloses this kind of vehicle seat. This vehicle seat has a frame member that configures a seat frame, a cushion material that configures an outer shape of the seat and can elastically support a passenger, and a support member. The support member has a frame-shaped member that can be engaged to front and rear of the frame member, and a planar member that is attached to the frame-shaped member in a tensioned state. The frame-shaped member is a rectangular frame member and has a pair of rod-shaped parts (parts configuring sides of the frame-shaped member) extending in a front-rear direction of the seat. The planar member is a planer (sheet-like) material configured by weaving a thread material of natural or synthetic fabric.

In a related-art, the planar member is arranged on the frame-shaped member, and then, ends of the planar member are wound on the respective rod-shaped parts, are inwardly bent and sewed to a backside of the planar member. Accordingly, the planar member is attached to the frame-shaped member in a tensioned state, and then, the cushion material is supported by the planar member with the frame-shaped member being engaged to the frame member.

Incidentally, according to the above support member, when the tension of the planar member is insufficient, the planar member deviates from the frame-shaped member (the planar member is relatively rotated around the rod-shaped parts), so that sufficient support performance of the cushion material may not be obtained. Therefore, it is necessary to attach the planar member to the frame-shaped member while sufficiently applying tension to the planar member, which would cause the operation of attaching the planar member to be troublesome.

In view of this problem, JP-A-2011-254952 discloses a technique of arranging a planar member in a tensioned state beforehand in a cavity of a molding die when molding a frame-shaped member (made of resin). Then, by injecting a raw material (melted resin) for molding into the molding die, it is possible to integrally attach the planar member while molding the frame-shaped member.

However, according to the technique disclosed in JP-A-2011-254952, the planar member (thread material) may be partially broken due to heat at the molding. Therefore, the tension of the planar member is partially weakened, so that the support performance of the cushion material may be deteriorated.

Therefore, both the above techniques cannot always be adopted, considering the performance (the support performance, the operability and the like) of the support member.

SUMMARY OF THE INVENTION

The present invention has been made in view of the above circumstances, and an object of the present invention is to attach a planar member to a frame-shaped member with high performance.

According to an illustrative embodiment of the present invention, there is provided a vehicle seat including a seat component member which is a seat cushion or a seat back. The seat component member includes: a frame member configuring a seat frame; a cushion material configuring an outer shape of the seat and capable of elastically supporting a passenger; and a support member arranged on the frame member and capable of supporting the cushion material. The support member includes a frame-shaped member having a polygonal shape that can be attached to the frame member, and a bag-shaped planar member that is attached to the frame-shaped member in a tensioned state to support the cushion material. The frame-shaped member can be accommodated in the bag-shaped planner member while at least one side of the frame-shaped member is at a contracted state. The frame-shaped member is maintained at an expanded state as the at least one side of the frame-shaped member is at a non-contracted state, such that the planner member is expanded from an inner side thereof and is maintained at the tensioned state.

According to the above configuration, it is possible to attach the planar member with high operability and to appropriately maintain the tension (support performance) of the planar member by appropriately expanding/contracting the frame-shaped member.

In the above vehicle seat, the support member may include a restraint member that is attached to the frame-shaped member covered with the planar member to restrain a relative movement between the frame-shaped member and the planar member.

According to this configuration, it is possible to maintain the support performance of the cushion material more favorably by appropriately suppressing deviation between the planar member and the frame-shaped member by the restraint member.

In the above vehicle seat, the support member may include a pair of divided end portions formed by partially dividing the frame-shaped member, and a connection member that connects the pair of divided end portions, and when the pair of divided end portions are made close to each other, the frame-shaped member may become the contracted state, and the frame-shaped member may be maintained at the expanded state by connecting the pair of divided end portions with the connection member while the pair of divided end portions are spaced from each other.

According to this configuration, it is possible to attach the planar member with high performance and to appropriately maintain the tension of the planar member while the pair of divided end portions are made close to each other and to be spaced from each other (which is a relatively simple operation).

DETAILED DESCRIPTION

Hereinafter, illustrative embodiments of the present invention will be described with reference to FIGS. 1 to 8C. In the respective drawings, a reference numeral F indicates the front of a vehicle seat, a reference numeral B indicates the rear of the vehicle seat, a reference numeral UP indicates the upper of the vehicle seat and a reference numeral DW indicates the lower of the vehicle seat.

Figure 1:
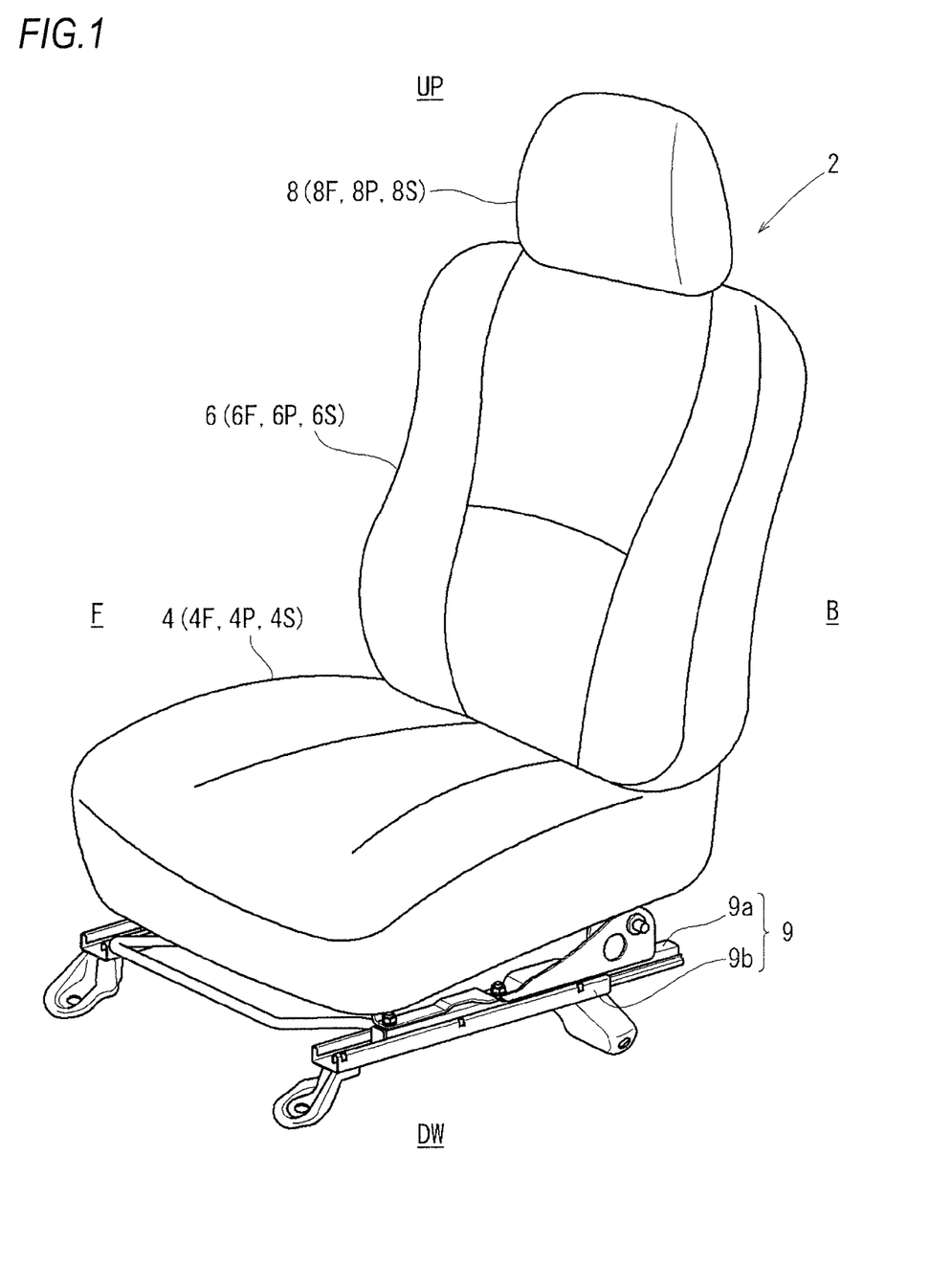
FIG. 1 is a perspective view of a vehicle seat.

A vehicle seat 2 of FIG. 1 has seat component members (a seat cushion 4, a seat back 6 and a headrest 8) and a rail member 9.

Each seat component member has a frame member 4F, 6F, 8F configuring a seat frame, a cushion material 4P, 6P, 8P configuring an outer shape of the seat, and a cover material 4S, 6S, 8S covering the cushion material.

The rail member 9 is a member for slide-moving the seat component members in a front-rear direction of a vehicle and has an upper rail 9a and a lower rail 9b. In this illustrative embodiment, the frame member 4F is attached to a top of the upper rail 9a, and the lower rail 9b is attached to a floor surface of a vehicle interior. Then, both the rails are slidably mounted, so that the seat component member can be slid relative to the floor surface of the vehicle interior in the front-rear direction of the vehicle.

First Illustrative Embodiment

The seat cushion 4 has basic components 4F, 4P, 4S and a support member 20 (a frame-shaped member 22 and a planar member 26) (refer to FIG. 2, the respective members will be specifically described later).

In this illustrative embodiment, the frame member 4F is attached with the support member 20 and is covered with a cover material 4S while supporting the cushion material 4P.

The support member 20 has a frame-shaped member 22 and a planar member 26 (these will be specifically described later) and supports the cushion material 4P by the planar member 26, which is attached to the frame-shaped member 22 in a tensioned state, with the frame-shaped member 22 being engaged to the frame member 4F. In this configuration, it is advantageous to attach the planar member 26 to the frame-shaped member 22 with high performance (for example, support performance and operability).

Hence, in this illustrative embodiment, the planar member 26 is attached to the frame-shaped member 22 with high performance by a configuration that will be described later. In the below, the respective configurations are specifically described.

[Basic Components]

Figure 2:
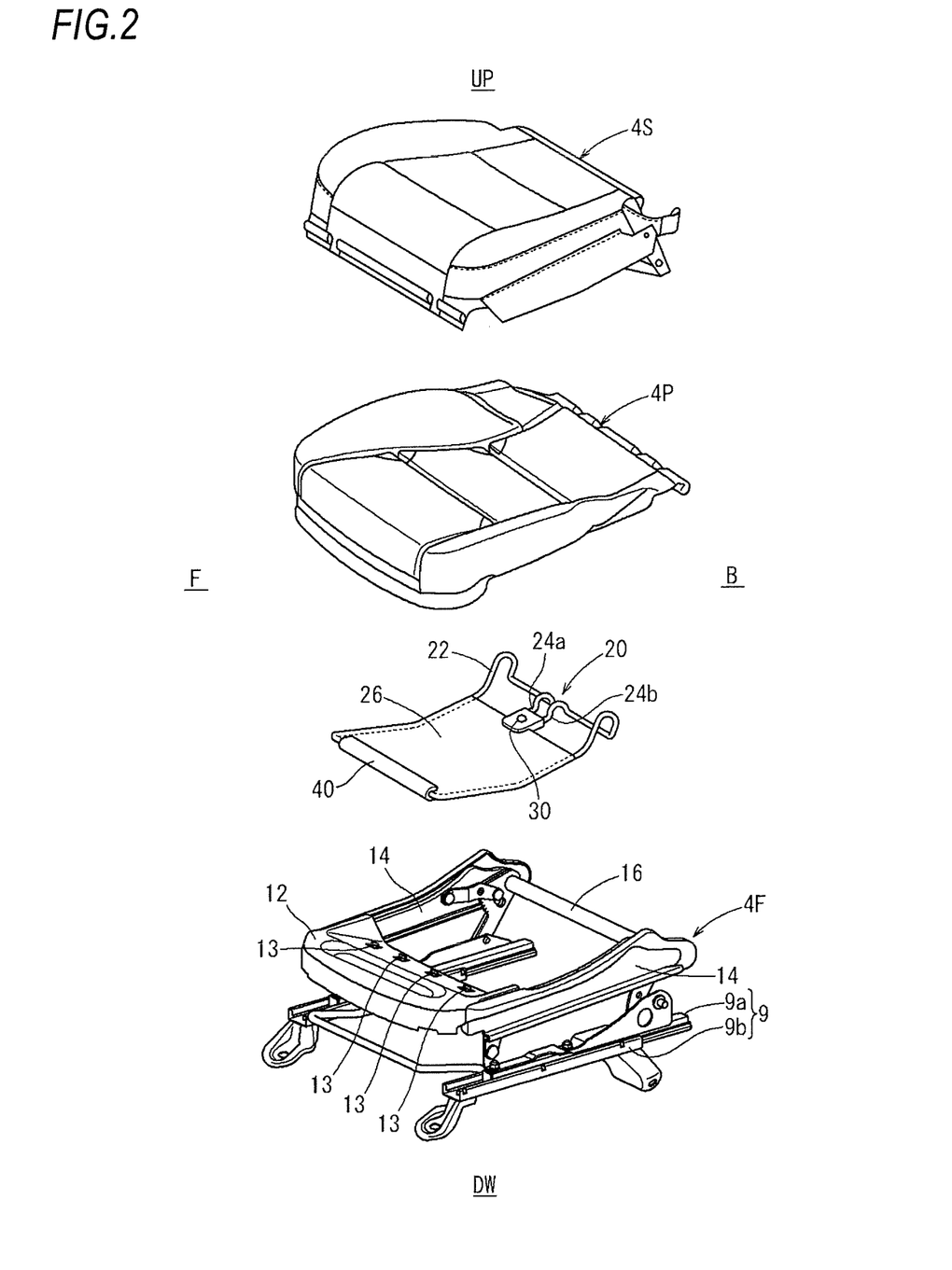
FIG. 2 is an exploded perspective view of a seat cushion.

The seat cushion 4 (basic component) has the cover material 4S, the cushion material 4P, and the frame member 4F (refer to FIG. 2).

The cover material 4S is a bag-shaped member that can cover the cushion material 4P and may be made of cloth (fabric, knitted fabric, non-woven fabric) or leather (natural leather, synthetic leather). The cushion material 4P may be formed of a resin member such as polyurethane foam and the like, for example.

The frame member 4F is a substantially rectangular (when seen from the upper) frame body and has a front frame 12, a pair of side frames 14 and a rear frame 16 (refer to FIG. 2).

The front frame 12 is a (flat plate-shaped) member configuring a front side frame of the seat cushion 4 and has a plurality of claw parts 13. Each claw part 13 is a member having a substantial inverted L shape (when seen from the side) and can engage (hold) the frame-shaped member 22 that will be described later. In this illustrative embodiment, the plurality of claw parts 13 can be formed at an appropriate interval on an upper surface (an inclined surface) of the front frame 12.

Also, the side frames 14 are flat plate-shaped members configuring side frames of the seat cushion 4, respectively, and are arranged to face each other at sides of the seat. The rear frame 16 is a (cylindrical) rod member reinforcing a rear side part of the frame member 4F and is mounted to be laid over between the pair of side frames 14.

[Support Member]

The support member 20 is a member that is arranged on the frame member 4F and supports the cushion material 4P, and has the planar member 26, the frame-shaped member 22, a connection member 30, and a restraint member 40 (refer to FIGS. 2 to 4B, the respective members will be specifically described later).

In this illustrative embodiment, as described below, the frame-shaped member 22 can take a contracted state and an expanded state. The frame-shaped member 22 is accommodated in the planar member 26 while the frame-shaped member 22 is at the contracted state and is then moved to and maintained at the expanded state, so that the planar member 26 is expanded from an inner side with being applied with tension.

(Frame-Shaped Member)

Figure 3A:
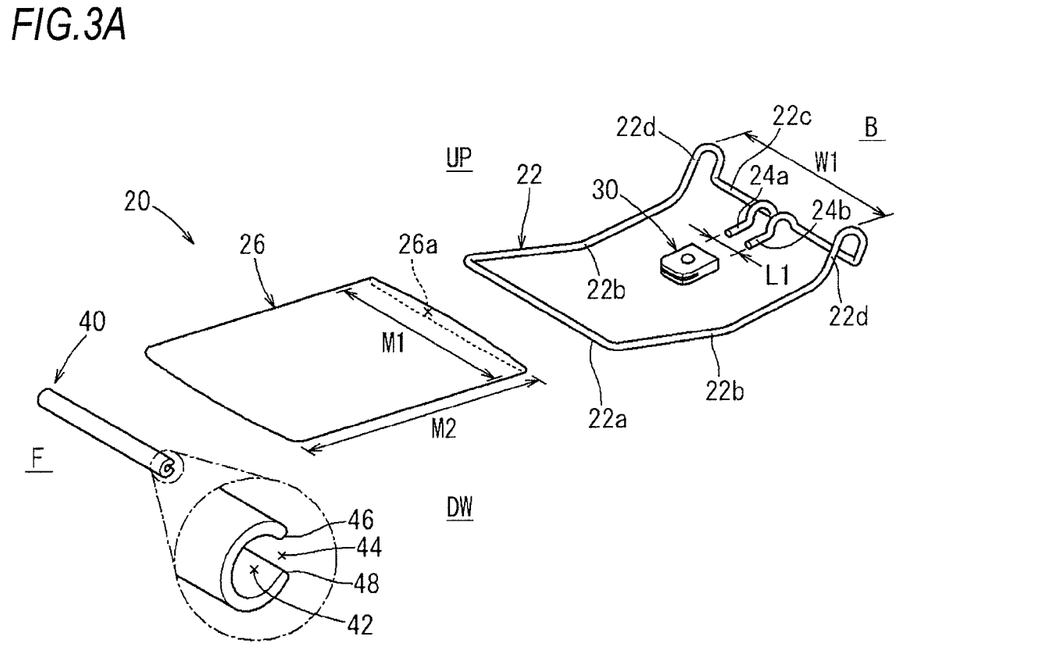
FIG. 3A is an exploded perspective view of a support member.
Figure 3B:
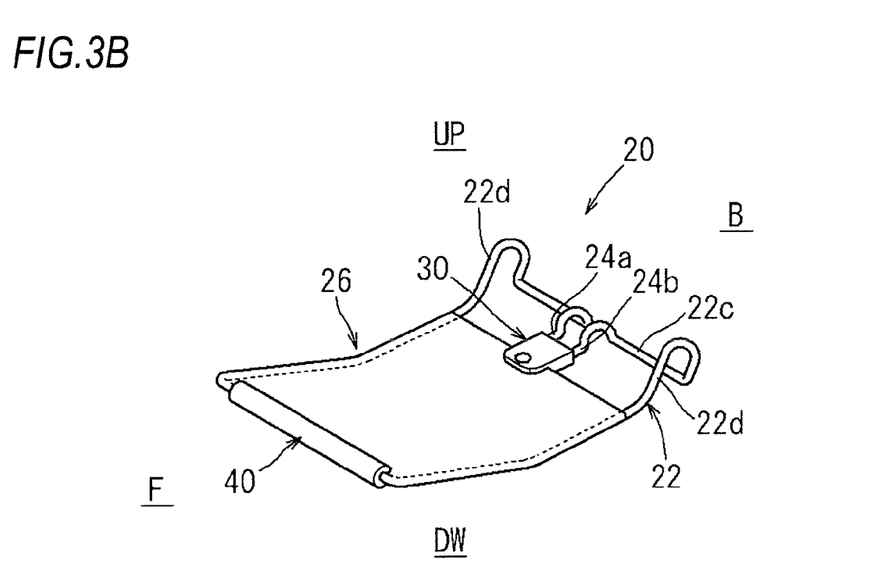
FIG. 3B is a perspective view of the support member after assembling.

The frame-shaped member 22 is a frame member that can be arranged on the frame member 4F (refer to FIGS. 2 to 3C). In this illustrative embodiment, the frame-shaped member 22 is substantially rectangular (when seen from the upper) and has a front frame part 22a, a pair of side frame parts 22b, a rear frame part 22c and a pair of divided end portions 24a, 24b (which will be described later).

The front frame part 22a is a part forming one side of the front side part of the frame-shaped member 22, is arranged at the front of the seat and extends in a width direction of the seat. The rear frame part 22c is a part forming one side of the rear side part of the frame-shaped member 22, is arranged at the rear of the seat and extends in the width direction of the seat.

Each of the side frame parts 22b is a part forming one side of a side part of the frame-shaped member 22 and extends in the front-rear direction of the seat. A front end of each side frame part 22b is connected to the front frame part 22a, and a rear end of each side frame part 22b is connected to the rear frame part 22c. A rear side part 22d of each side frame part 22b is bent into a substantial inverted U shape and can be engaged to the rear frame 16 (refer to FIG. 2).

(Divided End Portions)

The divided end portions 24a, 24b are portions that are formed by partially dividing one side of the frame-shaped member 22 and may be formed at a center of the rear frame part 22c, in this illustrative embodiment (refer to FIGS. 3A to 3C).

Each of the divided end portions 24a, 24b is bent from the rear frame part 22c towards the front of the seat. A tip end of each of the divided end portions 24a, 24b is bent upwards in a quarter-circle shape and then linearly extended towards the front of the seat.

In this illustrative embodiment, the respective divided end portions 24a, 24b are spaced with a predetermined clearance when the frame-shaped member 22 (an outer shape thereof is substantially rectangular) is at a normal state (a spaced size is L1). At this state (at a non-contracted state), a size of the rear frame part 22c is substantially the same as that of the front frame part 22a while the pair of side frame parts 22b are arranged to be parallel to each other with a spaced size W1 (the frame-shaped member 22 is at the expanded state).

When the respective divided end portions 24a, 24b are brought close to each other (when the rear frame part is contracted), the pair of side frame parts 22b (the rear side parts) are moved in a direction of coming close to each other, so that the frame-shaped member 22 can be contracted.

Although the material of the frame-shaped member 22 is not particularly limited, a central part of the frame-shaped member 22 may be formed of metal such as steel and an outer part thereof may be formed of a resin, for example.

As the resin of the frame-shaped member 22, a thermoplastic resin (polypropylene, poly vinyl chloride, polyethylene) or thermosetting resin (phenol resin, melamine resin, epoxy resin, urea resin) may be exemplified.

The frame-shaped member 22 may be typically formed by a molding die. At this time, in this illustrative embodiment, since it is not necessary to arrange the planar member 26 in a cavity of the molding die, a manufacturing process thereof is simplified, so that the manufacturing cost can be reduced or the manufacturing time can be shortened.

(Planar Member)

The planar member 26 is a bag-shaped member (an entire shape is a bag shape) having flexibility capable of supporting the cushion material 4P, and one side 26a thereof has an open shape, so that the frame-shaped member 22 can be inserted therein (refer to FIG. 3).

Although the material of the planar member 26 is not particularly limited, cloth (woven fabric, knitted fabric, non-woven fabric), leather (natural leather, synthetic leather) or netted body (a member formed by weaving fabric into a net shape) may be exemplified.

In this illustrative embodiment, the planar member 26 has a width size M1 such that the frame-shaped member 22 of the contracted state can be inserted therein, and the planner member 26 becomes a tensioned state (tension is applied thereto) when the frame-shaped member 22 of the expanded state is accommodated therein. Also, a depth size M2 of the planar member 26 is shorter than the frame-shaped member 22 such that the frame-shaped member 22 can be accommodated in the planar member 26 while the rear side parts 22d of the side frame parts is exposed.

(Connection Member)

Figure 4A:
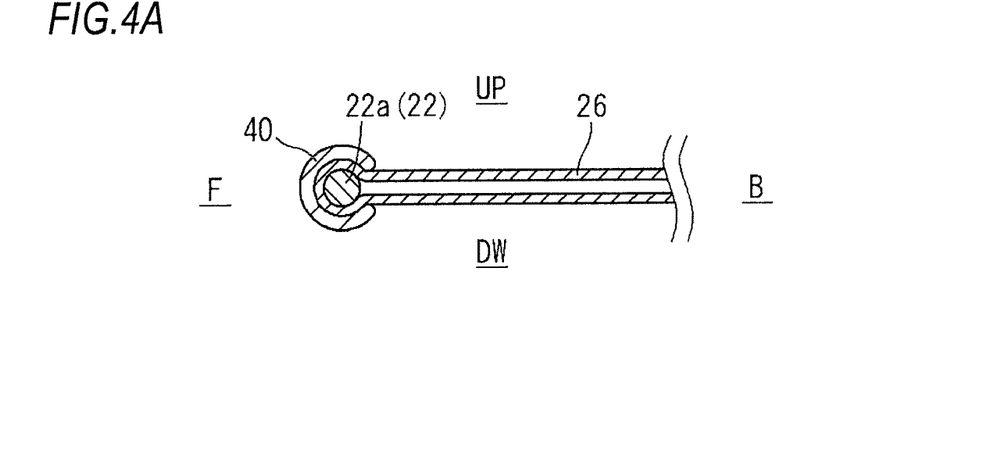
FIG. 4A is a partial sectional view of the support member.
Figure 4B:
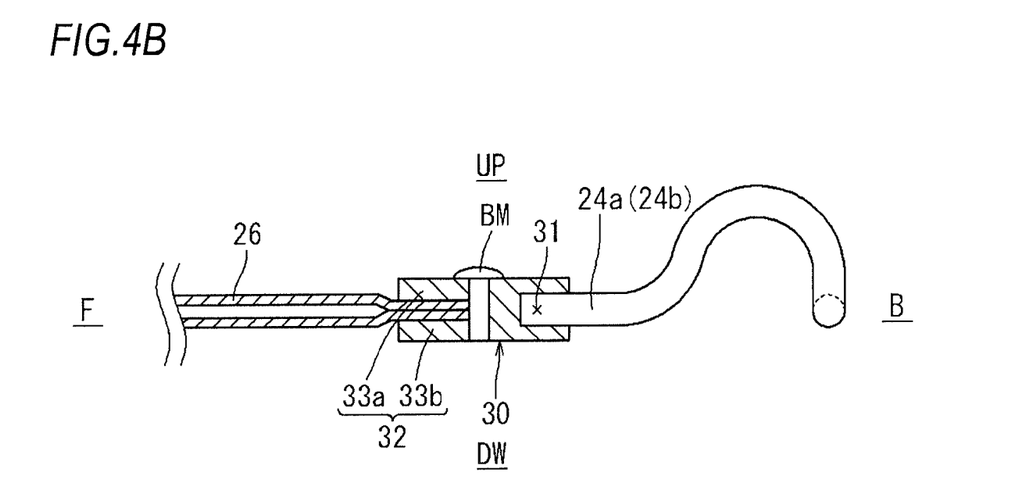
FIG. 4B is another sectional view showing another part of the support member.

The connection member 30 is a member connecting the pair of divided end portions 24a, 24b, and has a first attachment part 31 and a second attachment part 32 (refer to FIGS. 3A, 3B and 4B).

In this illustrative embodiment, the connection member 30 is a relatively short and flat plate-shaped member and has a length size that can be laid over the pair of divided end portions 24a, 24b (at the non-contracted state).

The first attachment part 31 has a pair of hole portions (or recess portions) formed at one side of the connection member 30, and the tip ends of the respective divided end portions 24a, 24b can be press-fitted therein. At this time, an inner diameter of the first attachment part 31 is tapered (is gradually narrowed as proceeding inwardly), so that the tip ends of the respective divided end portions 24a, 24b can be press fitted therein and stably attached.

The second attachment part 32 is a part that can hold therein the planar member 26 (the rear side part). In this illustrative embodiment, the second attachment part 32 is configured by a pair of plate-shaped portions 33a, 33b that can be deformed (closed) in a direction of coming close to each other. The planar member 26 is sandwiched between the pair of plate-shaped portions 33a, 33b, and both the plate-shaped portions are closed by a bolt member BM, so that the planar member 26 can be held by the second attachment part 32.

Modified Illustrative Embodiments

Figure 5:
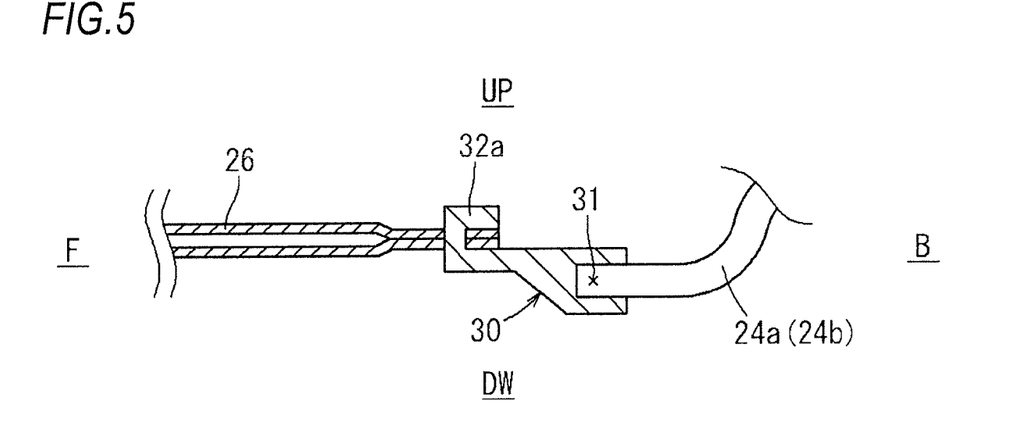
FIG. 5 is a partial sectional view of the support member showing a connection member according to a modified illustrative embodiment.

Incidentally, the connection member can be variously configured, in addition to the above configuration (refer to FIG. 5).

For example, in a modified illustrative embodiment, a hook-shaped (a substantial J shape in a transverse direction, when seen from the sectional view) protrusion is provided as a second attachment part 32a. The planar member 26 (rear side part) is formed with a hole portion (not shown) into which the second attachment part 32a can be inserted. The second attachment part 32a is inserted into the hole portion, so that the planar member 26 can be held by the second attachment part 32a.

Also, as an alternative shape (not shown) of the first attachment part, a configuration (a configuration of holding the divided end portions) that is substantially the same as the second attachment part 32 may be adopted.

As an alternative shape (not shown) of the connection member, the first attachment part and the second attachment part can be connected by an extendable part. The planar member 26 is attached to the second attachment part by extending the extendable part, and the planar member 26 is applied with tension by a force with which the extendable part returns to its original shape.

(Restraint Member)

The restraint member 40 is a member that restrains relative movement of the frame-shaped member 22 and the planar member 26 and may be formed of deformable metal or a material having flexibility (resin, elastomer or rubber) (refer to FIGS. 3A, 3B and 4A).

In this illustrative embodiment, the restraint member 40 is a cylindrical member (having a substantial C shape, when seen from the sectional view) that can be arranged along the front frame part 22a, and has an accommodation part 42 and an opening part 44.

The accommodation part 42 is an internal space following an outer shape of the frame-shaped member 22. The opening part 44 is a recess-shaped opening extending in a longitudinal direction of the restraint member 40 and is formed by separating a pair of edge portions 46, 48 of the restraint member 40. An opening size of the opening part 44 is set to be smaller than a diameter size of the frame-shaped member 22.

As described later, the frame-shaped member 22 is covered by the planar member 26 and is then pressed into the restraint member 40 (the accommodation part 42). At this time, the restraint member 40 has the flexibility, so that it is possible to enlarge the opening part 44 while separating the pair of edge portions 46, 48 (it is possible to press fit and mount the frame-shaped member 22). After the mounting, the planar member 26 is held by a pressing force of the pair of edge portions 46, 48 (a force with which the edge portions return to the original state), so that it is possible to restrain the relative movement to the frame-shaped member 22.

At this time, the pair of edge portions 46, 48 (the portions abutting on the planar member 26 at the mounting and press fitting) are preferably formed to have a convex curved shape. For example, in this illustrative embodiment, the pair of edge portions 46, 48 are formed to have an arc shape (when seen from the sectional view), so that it is possible to mount the restraint member 40 without damaging the planar member 26.

Modified Illustrative Embodiments

Figure 6A:
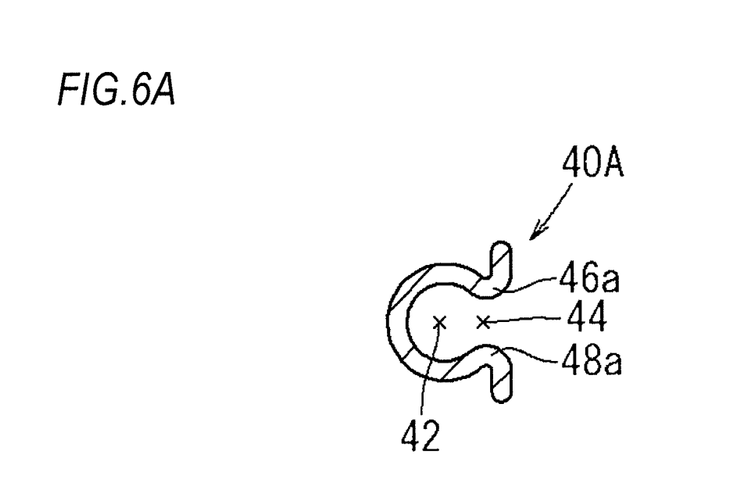
FIG. 6A is a sectional view of a restraint member according to a modified illustrative embodiment.
Figure 6B:
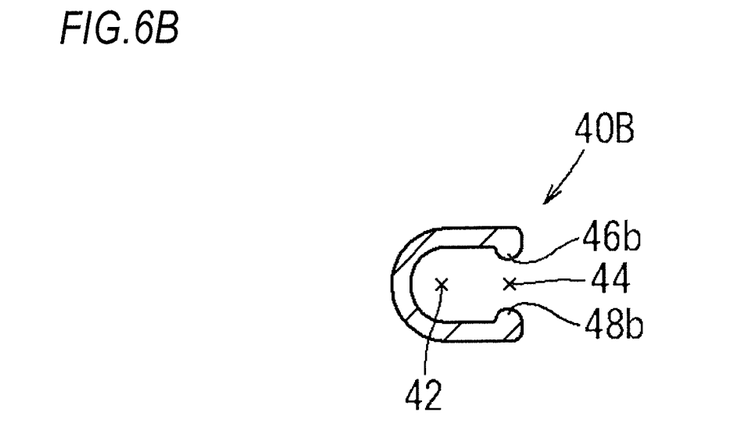
FIG. 6B is a sectional view of a restraint member according to another modified illustrative embodiment.

The restraint member can be variously configured, in addition to the above configuration (refer to FIGS. 6A and 6B).

For example, referring to FIG. 6A, a restraint member 40A is provided with a pair of edge portions 46a, 48a that are bent in a direction of coming close to each other and is then bent outwards. Also in this configuration, the pair of edge portions 46a, 48a are bent in the direction coming close to each other at a part abutting on the planar member 26, so that it is possible to mount the restraint member 40A without damaging the planar member 26.

Further, referring to FIG. 6B, a restraint member 40B can be formed to have a substantial U shape in a transverse direction. At this time, protrusions 46b, 48b having a half-circle shape (when seen from the sectional view) are provided to the pair of edge portions, respectively, so that it is possible to mount the restraint member 40B without damaging the planar member 26.

In the meantime, as an alternative shape (not shown) of the restraint member, a configuration (a configuration of holding the frame-shaped member) that is substantially the same as the second attachment part 32 may be adopted.

[Operation of Mounting Support Member]

Referring to FIGS. 3A to 4B, the support member 20 is formed by covering the frame-shaped member 22 with the planar member 26 and attaching the restraint member 40 and the connection member 30 thereto.

In this illustrative embodiment, the pair of divided end portions 24a, 24b are made to come close to each other, so that the rear frame part 22c is contracted. Accordingly, the frame-shaped member 22 can be smoothly accommodated in the planar member 26 while being contracted.

Then, the pair of divided end portions 24a, 24b is spaced such that the rear frame part 22c becomes the non-contracted state and the frame-shaped member 22 becomes the expanded state (at the state where the outer shape is substantially rectangular). At this state, the pair of divided end portions 24a, 24b is connected by the connection member 30 (the first attachment part 31), so that the frame-shaped member 22 can be maintained at the expanded state. Accordingly, the planar member 26 is expanded from the inner side by the frame-shaped member 22 (of the expanded state), so that the planar member 26 can be maintained at the tensioned state (while the appropriate tension is applied thereto). Also, the rear side part of the planar member 26 is attached to the connection member 30 (the second attachment part 32), so that it is possible to appropriately hold the tension of the planar member 26 in the front-rear direction of the seat.

The frame-shaped member 22 is covered with the planar member 26 and then the restraint member 40 is mounted to the front frame part 22a. Accordingly, it is possible to appropriately suppress deviation between the frame-shaped member 22 and the planar member 26 (for example, relative rotation of the planar member 26 along the periphery of the front frame part 22a) by the restraint member 40.

Finally, the front side part (the front frame part 22a) of the support member 20 is engaged to the plurality of claw parts 13, and the rear side part (the rear side parts 22d of the side frame parts) of the support member 20 is hooked and engaged to the rear frame 16. Accordingly, the support member 20 is mounted onto the frame member 4F, so that the cushion member 4P can be arranged and supported on the support member 20.

As described above, in this illustrative embodiment, it is possible to attach the planar member 26 with high operability and to appropriately maintain the tension of the planar member 26 by appropriately expanding/contracting the frame-shaped member 22. Also, in this illustrative embodiment, it is possible to maintain the support performance of the cushion material 4P more favorably by appropriately suppressing the deviation between the planar member 26 and the frame-shaped member 22 by the restraint member 40.

In this illustrative embodiment, as the pair of divided end portions 24a, 24b are made to come close to each other and to be spaced from each other (which is a relatively simple operation), the frame-shaped member 22 can be contracted or expanded. Further, the expanded state of the frame-shaped member 22 can be stably maintained by the connection member 30.

Therefore, according to the illustrative embodiment, it is possible to attach the planar member 26 to the frame-shaped member 22 with high performance (support performance or operability).

Second Illustrative Embodiment

Since a vehicle seat of a second illustrative embodiment has substantially the same structure as the first illustrative embodiment, the common structures and the like are denoted with the corresponding reference numerals and the detailed descriptions thereof are omitted.

Figure 7A:
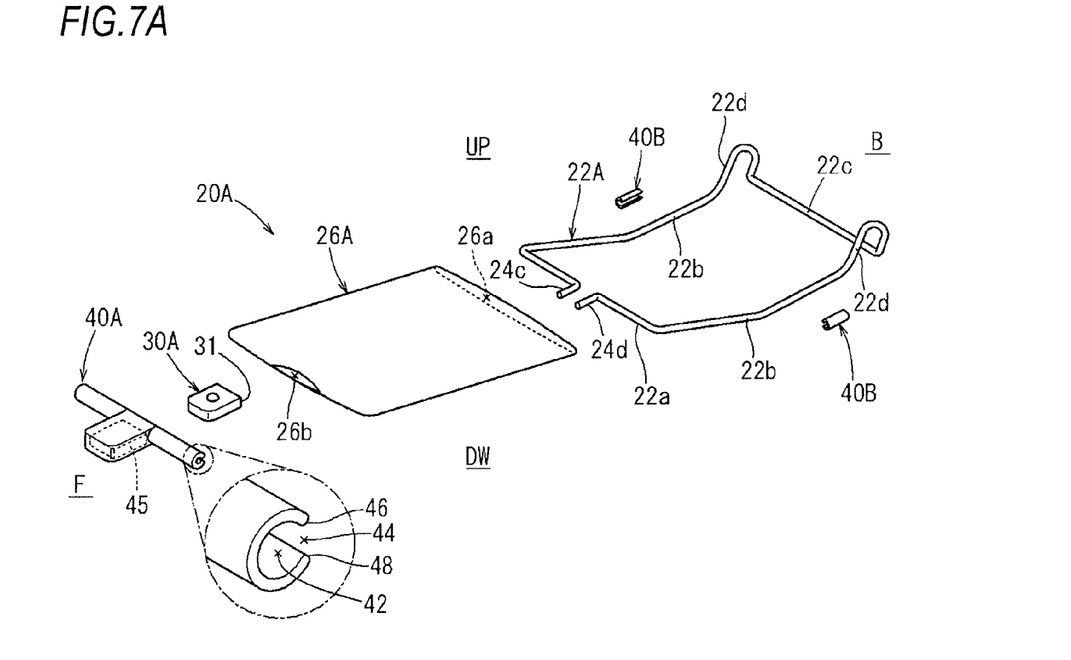
FIG. 7A is an exploded perspective view of a support member according to a second illustrative embodiment.
Figure 7B:
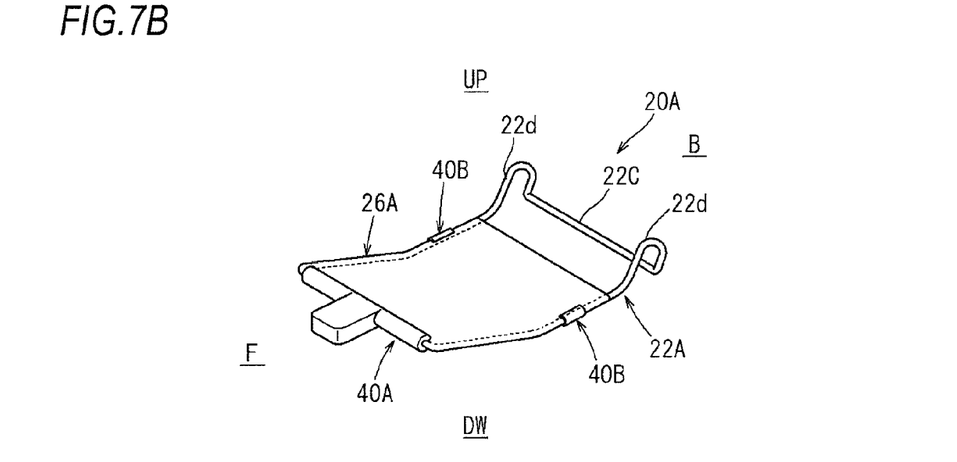
FIG. 7B is a perspective view of the support member after assembling.

In the second illustrative embodiment, a support member 20A has a frame-shaped member 22A, a planar member 26A, a connection member 30A, and a plurality of restraint members 40A, 40B (refer to FIGS. 7A and 7B).

In this illustrative embodiment, a pair of divided end portions 24c, 24d are formed at a center of the front frame part 22a and are bent towards the front of the seat, respectively. The planar member 26A is formed at a front side part thereof with hole portions 26b through which the pair of divided end portions 24c, 24d can pass. The frame-shaped member 22A is accommodated in the planar member 26A, so that the pair of divided end portions 24c, 24d can be enabled to protrude from the hole portions 26b towards the front of the seat.

The connection member 30A is a relatively short and flat plate-shaped member and can insert the pair of divided end portions 24c, 24d by the first attachment part 31 (the second attachment part can be omitted).

The first restraint member 40A is a member having a substantial C shape (when seen from the sectional view) that can be arranged along the front frame part 22a, and has the accommodation part 42, the opening part 44 and an arrangement part 45. The arrangement part 45 is a space part which can accommodate the connection member 30A, and may be provided at a center of the first restraint member 40A. Also, each of the pair of second restraint members 40B is a member having a substantial C shape that can be arranged along a part of the side frame part 22b, and has an accommodation part and an opening part (the reference numerals thereof are omitted).

In this illustrative embodiment, the pair of divided end portions 24c, 24d are made to come close to each other, thereby enabling the front frame part 22a to be at the contracted state. Therefore, the frame-shaped member 22A can be smoothly accommodated in the planar member 26A while being contracted.

Then, the pair of divided end portions 24c, 24d are spaced such that the front frame part 22a becomes the non-contracted state and the frame-shaped member 22A becomes the expanded state (at the state where the outer shape is substantially rectangular). At this state, the pair of divided end portions 24c, 24d are connected by the connection member 30A, so that the frame-shaped member 22A can be maintained at the expanded state.

Accordingly, after the frame-shaped member 22A is covered with the planar member 26A, the restraint member 40A is fitted to the front frame part 22a, and the second restraint members 40B are respectively fitted to the side frame parts 22b. Therefore, it is possible to appropriately suppress the deviation between the planar member 26A and the frame-shaped member 22A.

Further, in this illustrative embodiment, it is possible to attach the planar member 26A to the frame-shaped member 22A with high performance.

Third Illustrative Embodiment

Since a vehicle seat of a third illustrative embodiment has substantially the same structure as the first or second illustrative embodiment, the common structures and the like are denoted with the corresponding reference numerals and the detailed descriptions thereof are omitted.

Figure 8A:
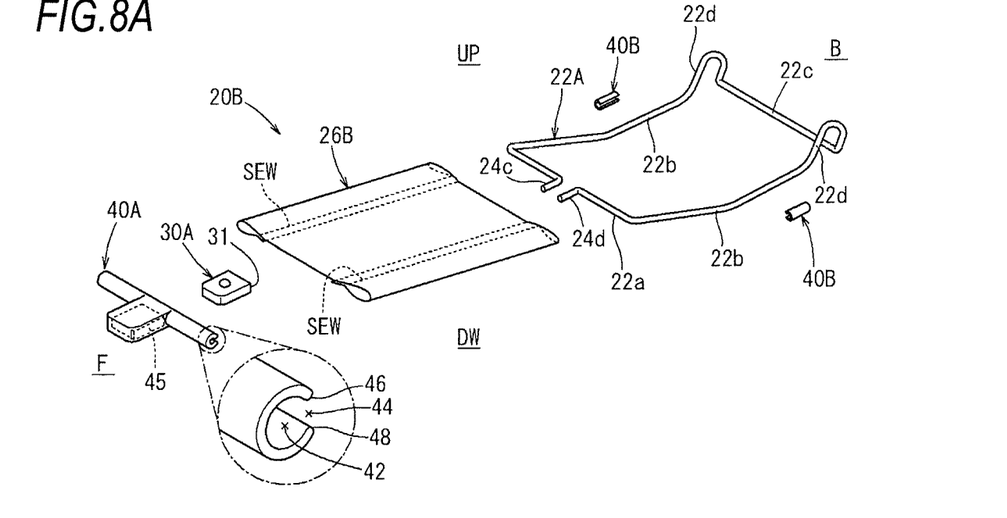
FIG. 8A is an exploded perspective view of a support member according to a third illustrative embodiment.
Figure 8B:
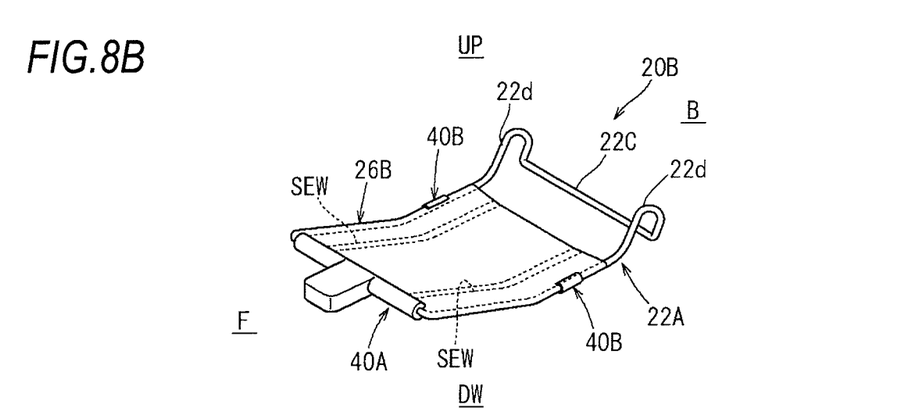
FIG. 8B is a perspective view of the support member after assembling.
Figure 8C:
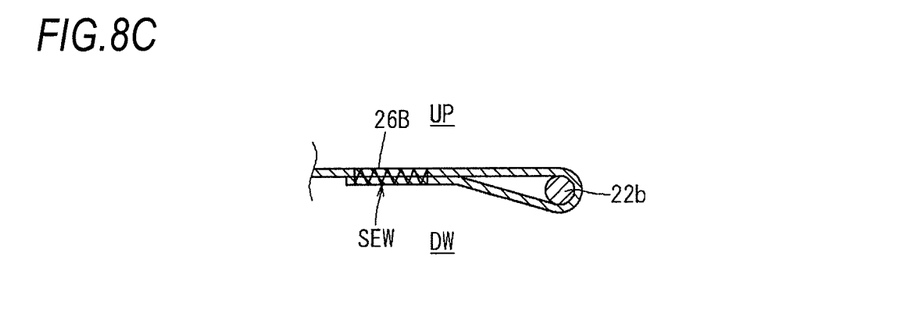
FIG. 8C is a partial sectional view of the support member.

A support member 20B of the third illustrative embodiment has a frame-shaped member 22A, a planar member 26B, a connection member 30A, and a plurality of restraint members 40A, 40B (refer to FIG. 8).

The planar member 26B is a plane-shaped member having flexibility that can support the cushion material 4P and both sides thereof can be (partially) formed to have a pouch shape.

In this illustrative embodiment, the frame-shaped member 22A is covered with the planar member 26B while maintaining the front frame part 22a at the contracted state (for example, fixing it with a jig). At this state, both sides of the planar member 26B are respectively folded inwards (to cover the peripheries of the side frame parts 22b) and tip ends of both sides are sewed to a backside of the planar member 26B (a sewing line SEW). Accordingly, both sides of the planar member 26B can be partially formed to have a bag shape.

Then, the frame-shaped member 22A is caused to become the expanded state (the outer shape thereof is substantially rectangular). At this state, the pair of divided end portions 24c, 24d are connected by the connection member 30A, so that the frame-shaped member 22A can be maintained at the expanded state. Then, the first restraint member 40A is fitted to the front frame part 22a, and the second restraint members 40B are respectively fitted to the side frame parts 22b.

In this illustrative embodiment, the planar member 26B can be formed of a relatively small amount of cover material (which contributes to the reduction of the manufacturing cost).

The vehicle seat of the present invention is not limited to the above illustrative embodiments and can be implemented by a variety of illustrative embodiments.

(1) In the above illustrative embodiments, the pair of divided end portions 24a, 24b (24c, 24d) are provided to contract one side (the front frame part, the rear frame part) of the frame-shaped member. In contrast, one side of the frame-shaped member may be configured so that it is partially contracted and expanded (by using a spring material or rubber material) and is thus contracted. At this time, two or more sides of the frame-shaped member (for example, both the front frame part and the rear frame part) may be configured to be contracted.

In the above illustrative embodiments, the configuration (the forming position, the shape and the like) of the divided end portions have been exemplified. However, the corresponding configuration can be appropriately changed depending on the seat configuration.

(2) In the above illustrative embodiments, the rectangular frame-shaped member 22 (the shape following the outer shape of the frame member) has been exemplified. However, the shape of the frame-shaped member is not necessarily matched with the shape of the frame member and a variety of polygonal shape such as square shape may be also adopted. Also, the shape of the planar member can be appropriately changed depending on the shape of the frame-shaped member. Also, the method of attaching the frame-shaped member to the frame member is not limited to the above illustrative embodiments and can be appropriately changed.

Also, regarding the frame-shaped member of the expanded state, it may be possible to make the pair of side frame parts (rear part sides) larger (or smaller) than the spaced size W1.

(3) In the above illustrative embodiments, the connection member 30 and the restraint member 40 have been used. However, each member can be appropriately omitted depending on the seat configuration. Also, the configurations (the shapes, sizes, arrangement positions, the number to be provided, and the like) of the connection member and restraint member can be appropriately changed. For example, the restraint member can be bent and then mounted to a corner part of the frame-shaped member.

(4) In the above illustrative embodiments, the seat cushion has been exemplified. However, the configurations of the illustrative embodiments can be also applied to the various seat component members such as a seat back.

What is claimed is:
1. A vehicle seat comprising:
a seat component comprising a seat cushion or a seat back, the seat component including:
a frame defining a seat frame;
a cushion material configuring an outer shape of the seat and capable of elastically supporting a passenger; and
a support arranged on the frame and capable of supporting the cushion material, the support including a frame-shaped support frame having a polygonal shape that can be attached to the frame, and a bag-shaped planar member that is attached to the frame-shaped support frame in a tensioned state to support the cushion material,
wherein the frame-shaped support frame can be accommodated in the bag-shaped planar member while at least one side of the frame-shaped support frame is in a contracted state, and
wherein the frame-shaped support frame is maintained in an expanded state as the at least one side of the frame-shaped support frame is in a non-contracted state, such that the bag-shaped planar is expanded from an inner side thereof and is maintained in the tensioned state.

2. The vehicle seat according to claim 1,
wherein the support includes a restraint that is attached to the frame-shaped support frame covered with the bag-shaped planar member to restrain a relative movement between the frame-shaped support frame and the bag-shaped planar member.

3. The vehicle seat according to claim 1,
wherein the support includes a pair of divided end portions formed by partially dividing the frame-shaped support frame, and a connector that connects the pair of divided end portions, and
wherein when the pair of divided end portions are brought close to each other, the frame-shaped support frame is placed into the contracted state, and the frame-shaped support frame is maintained at the expanded state by connecting the pair of divided end portions with the connector while the pair of divided end portions are spaced from each other.

* * * * *